US008783634B2

(12) United States Patent
Summers et al.

(10) Patent No.: US 8,783,634 B2
(45) Date of Patent: Jul. 22, 2014

(54) SUCTION DEVICE (71) Applicants: Adam P. Summers, Friday Harbor, WA (US); Stanislav Gorb, Kronshagen (DE)

(72) Inventors: Adam P. Summers, Friday Harbor, WA (US); Stanislav Gorb, Kronshagen (DE)

( * ) Notice: Subject to any disclaimer, the term of this patent is extended or adjusted under 35 U.S.C. 154(b) by 53 days.

(21) Appl. No.: 13/632,579

(22) Filed: Oct. 1, 2012

(65) Prior Publication Data
US 2013/0168523 A1 Jul. 4, 2013

Related U.S. Application Data (60) Provisional application No. 61/541,924, filed on Sep. 30, 2011.

(51) Int. Cl.
A45D 42/14 (2006.01)
(52) U.S. Cl.
USPC .................... 248/205.5; 248/206.2
(58) Field of Classification Search
USPC ............... 248/683, 467, 205.5, 205.6, 205.7, 248/206.2, 309.3; 269/21
See application file for complete search history.

(56) References Cited

U.S. PATENT DOCUMENTS

| | | | | | |
|---|---|---|---|---|---|
| 1,426,930 | A | * | 8/1922 | Waldron | 294/188 |
| 2,278,075 | A | * | 3/1942 | Hecht | 248/205.5 |
| 2,777,141 | A | * | 1/1957 | Nye | 15/105 |
| 2,910,264 | A | * | 10/1959 | Lindenberger | 248/362 |
| 5,190,332 | A | * | 3/1993 | Nagai et al. | 294/189 |
| 6,737,160 | B1 | | 5/2004 | Full | |
| 6,872,439 | B2 | | 3/2005 | Fearing | |
| 7,011,723 | B2 | | 3/2006 | Full | |
| 7,690,610 | B2 | * | 4/2010 | Ristau | 248/206.2 |
| 7,799,423 | B2 | | 9/2010 | Majidi | |
| 7,811,272 | B2 | | 10/2010 | Lindsay | |
| 7,828,982 | B2 | | 11/2010 | Full | |
| 7,837,163 | B2 | * | 11/2010 | Takahashi et al. | 248/205.8 |
| 7,975,971 | B2 | * | 7/2011 | Carnevali | 248/205.5 |
| 2003/0124312 | A1 | | 7/2003 | Autumn | |
| 2005/0168001 | A1 | * | 8/2005 | Perlman et al. | 294/64.1 |
| 2006/0130294 | A1 | | 6/2006 | Adams | |

FOREIGN PATENT DOCUMENTS

| | | |
|---|---|---|
| JP | 9-177752 A | 7/1997 |
| JP | 11-236912 A | 8/1999 |
| WO | 01/49776 A2 | 7/2001 |

OTHER PUBLICATIONS

Green, D.M., and D. L Barber, "The Ventral Adhesive Disc of the Clingfish *Gobiesox maeandricus*: Integumental Structure and Adhesive Mechanisms," Canadian Journal of Zoology 66(7):1610-1619, 1988.
Kier, W.M., and A.M. Smith, "The Structure and Adhesive Mechanism of Octopus Suckers," Integrative and Comparative Biology 42(6):1146-1153, 2002.

* cited by examiner

*Primary Examiner* — Alfred J Wujciak
(74) *Attorney, Agent, or Firm* — Christensen O'Connor Johnson Kindness PLLC (57) ABSTRACT

A suction device having the ability to adhere to rough surfaces is provided, along with methods for attaching the suction device to a target surface. The suction device includes a body having a suction area and a plurality of micro-rods depending from margins of the suction area. The micro-rods provide sufficient friction when placed against a target surface that a suction seal can be formed by generating negative pressure between the suction area and the target surface. In certain embodiments, the suction device provides suction even on wet or underwater surfaces.

18 Claims, 12 Drawing Sheets

SUCTION DEVICE

CROSS-REFERENCE TO RELATED APPLICATION

This application claims the benefit of U.S. Patent Application No. 61/541,924, filed Sep. 30, 2011, the disclosure of which is hereby incorporated by reference in its entirety.

BACKGROUND

Traditional suction cups attach well to smooth surfaces. In certain suction cups, surface wetness can be accommodated by a suction cup while still maintaining a seal. However, surface roughness dramatically hinders the ability of a traditional suction cup to form and/or maintain a seal. Adding moisture to a rough surface makes forming a seal even more difficult.

In view of these shortcomings of traditional suction cups, a high-performance suction device (e.g., suction cup) capable of strong tenacity despite highly irregular, slippery, and wet surfaces is desired.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a suction device is provided. In one embodiment, the suction device includes:

a body formed from a polymer and having a suction area defined by one or more margins configured to rest in close apposition with a target surface, wherein the suction area is flexible and configured to create a suction seal against the target surface with negative pressure between the suction area and the target surface; and a plurality of elongated micro-rods depending from the one or more margins, wherein each of the plurality of elongated rods is less than 1000 microns in diameter, the plurality of micro-rods have a packing density such that the one or more margins are predominantly bounded with micro-rods, wherein the size, composition, and packing density of the micro-rods provide sufficient friction between the micro-rods and the target surface to maintain the suction seal between the suction area and the target surface;

wherein the body of the suction device and the plurality of micro-rods are configured to adhere to the target surface through a combination of suction generated by the negative pressure between the suction area and the target surface and friction generated between the plurality of micro-rods and the target surface.

In another aspect, a method is provided for attaching a suction device, as described herein, to a target surface. In one embodiment, the method includes the steps of:

placing the suction area in close apposition with the target surface; and generating negative pressure between the suction area and the target surface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A suction device having the ability to adhere to rough surfaces is provided, along with methods for attaching the suction device to a target surface. The suction device includes a body having a suction area and a plurality of micro-rods depending from margins of the suction area. The micro-rods provide sufficient friction when placed against a target surface that a suction seal can be formed by generating negative pressure between the suction area and the target surface. In certain embodiments, the suction device provides suction even on wet or underwater surfaces.

In one aspect, a suction device is provided. In one embodiment, the suction device includes:

a body formed from a polymer and having a suction area defined by one or more margins configured to rest in close apposition with a target surface, wherein the suction area is flexible and configured to create a suction seal against the target surface with negative pressure between the suction area and the target surface; and a plurality of elongated micro-rods depending from the one or more margins, wherein each of the plurality of elongated rods is less than 1000 microns in diameter, the plurality of micro-rods have a packing density such that the one or more margins are predominantly bounded with micro-rods, wherein the size, composition, and packing density of the micro-rods provide sufficient friction between the micro-rods and the target surface to maintain the suction seal between the suction area and the target surface;

wherein the body of the suction device and the plurality of micro-rods are configured to adhere to the target surface through a combination of suction generated by the negative pressure between the suction area and the target surface and friction generated between the plurality of micro-rods and the target surface.

The suction device will now be described with reference to the FIGURES. Referring particularly to the illustrated embodiments of FIGS. 1-5, a suction device 100 includes a body 102 having friction pads 104 on a side that attaches to a target surface, and a post 110 on the distal end away from the target surface. The suction device 100 is configured to adhere to a target surface and can be used in an manner as a means of attaching to the target surface. In certain embodiments the suction device 100 is attached to an object as a means for attaching the object to a target surface. In such an embodiment, the suction device can be attached to the object to be attached to the target surface using any methods know to those of skill in the art. For example, the suction device 100 could be manufactured monolithically with the object (e.g., as a structure depending from the object). Alternatively, the suction device 100 can be manufactured separately from the object and attached to the object mechanically (e.g., by an adhesive or a mechanical connector such as a screw. Referring to the representative device illustrated in FIGS. 1-5, the post 110 can be used as a point of attachment between the object and the suction device 100. However, the suction device disclosed herein is not limited to embodiments that include a post 110. Instead, the suction device 100 can be attached to an object by any means, of which the post 110 is only one example.

Figure 12A:
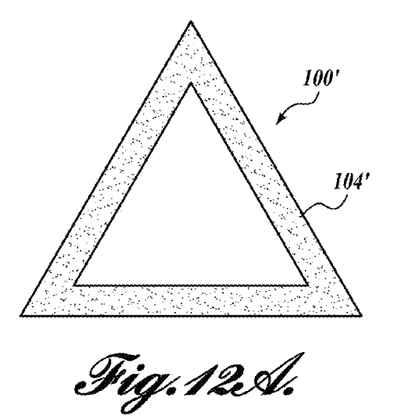
FIGS. 12A-12C are representative bottom plan views of suction devices in accordance with the embodiments described herein.
Figure 12B:
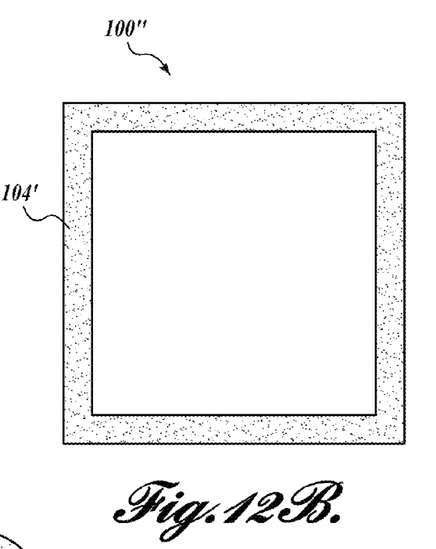
Figure 12C:
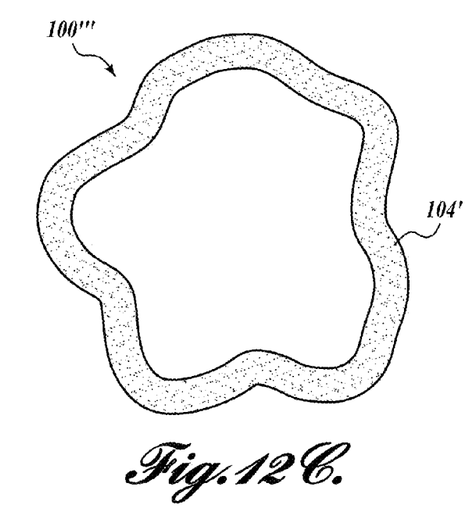

The body 102 is defined on its outer edge(s) by one or more margins. In the illustrated embodiments of FIGS. 1-5, the body 102 is circular and, therefore, has only one margin that is defined by the circumference of the body 102. However, it will be appreciated that the suction device is not limited to circular shapes, and any shape can be used so long as the suction device is able to operate according to the mechanisms described herein. As an example, FIGS. 12A-12C illustrate three additional shapes for the suction device: FIG. 12A is a triangle, which inherently has three margins, FIG. 12B is a square, which has four margins, and FIG. 12C is an irregular shape, which has one continuous margin.

The one or more margins are configured to rest in close apposition with a target surface. That is, the margins of the device 100 are configured to rest on a target surface to which the device 100 is to be adhered. Typically, the device 100 rests on the target surface, although the embodiments disclosed herein are not limited to such an arrangement, as close proximity without touching may also be effective.

The body 102 of the suction device 100 is formed from a polymer. The polymer can be any polymeric material known to those of skill in the art. The body need not be entirely formed from the polymer, although the body must incorporate enough of the polymer so as to allow for the body to be flexible such that the suction area can be compressed toward the target surface in order to generate negative pressure. The polymer that forms the body has the physical ability to elastically restore to a position such that an elastic restoration force away from the target surface can be used to generate negative pressure as part of the adhesion mechanism of the suction device. Therefore, any polymer material, either alone or in combination with other materials, that can be formed into a body that meets the requirements described herein, can be used.

The suction device 100 includes a suction area 116 that faces the target surface. The body 102 is flexible to the extent that the suction area 116 can be flexed toward the target surface so as to generate negative pressure in between the suction area 116 and the target surface through elastic restoration, as will be described further below.

Additionally, the suction area 116 is configured to create a suction seal against the target surface with negative pressure between the suction area and the target surface. The suction seal is such that gas and liquid cannot move between the suction area and the exterior of the device 100. The suction seal against the target surface is generated with the aid of friction provided by a plurality of elongated micro-rods depending from the one or more margins of the suction device 100. As illustrated in FIGS. 1-5, the micro-rods are grouped together in friction pads 104. The illustrated friction pads 104 are arranged in columns 112 and rows such that channels 114 are created in between the pads 104. The channels 114 allow gas and/or liquid within the suction area 116 to be forced out to the exterior of the device when the body 102 is compressed toward the target surface.

The friction pads 104 act to adhere to the target surface, particularly when negative pressure exists in the suction area 116, such that the friction pads 104 do not move along the target surface and thereby maintain the negative pressure in the suction area which generates the suction seal against the target surface.

Figure 1:
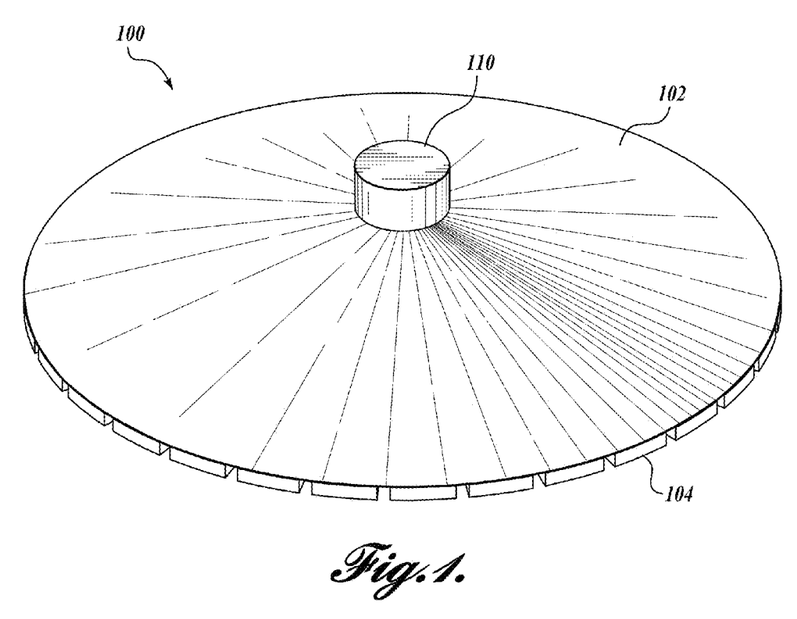
FIG. 1 is a top perspective view of a suction device in accordance with the embodiments described herein.
Figure 2:
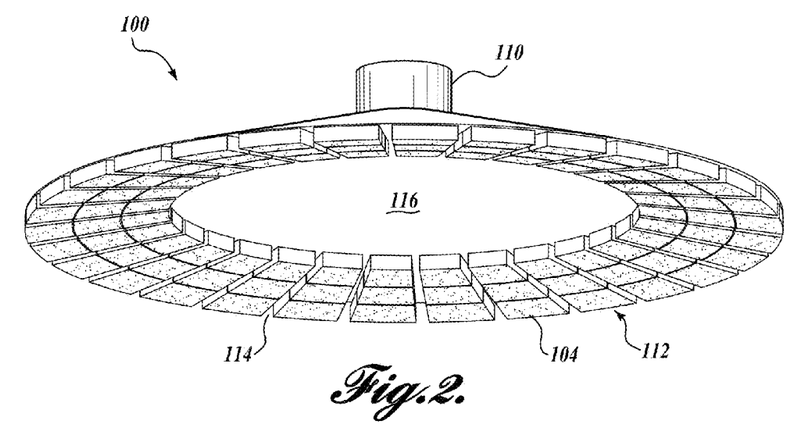
FIG. 2 is a bottom perspective view of the suction device of FIG. 1.
Figure 3:
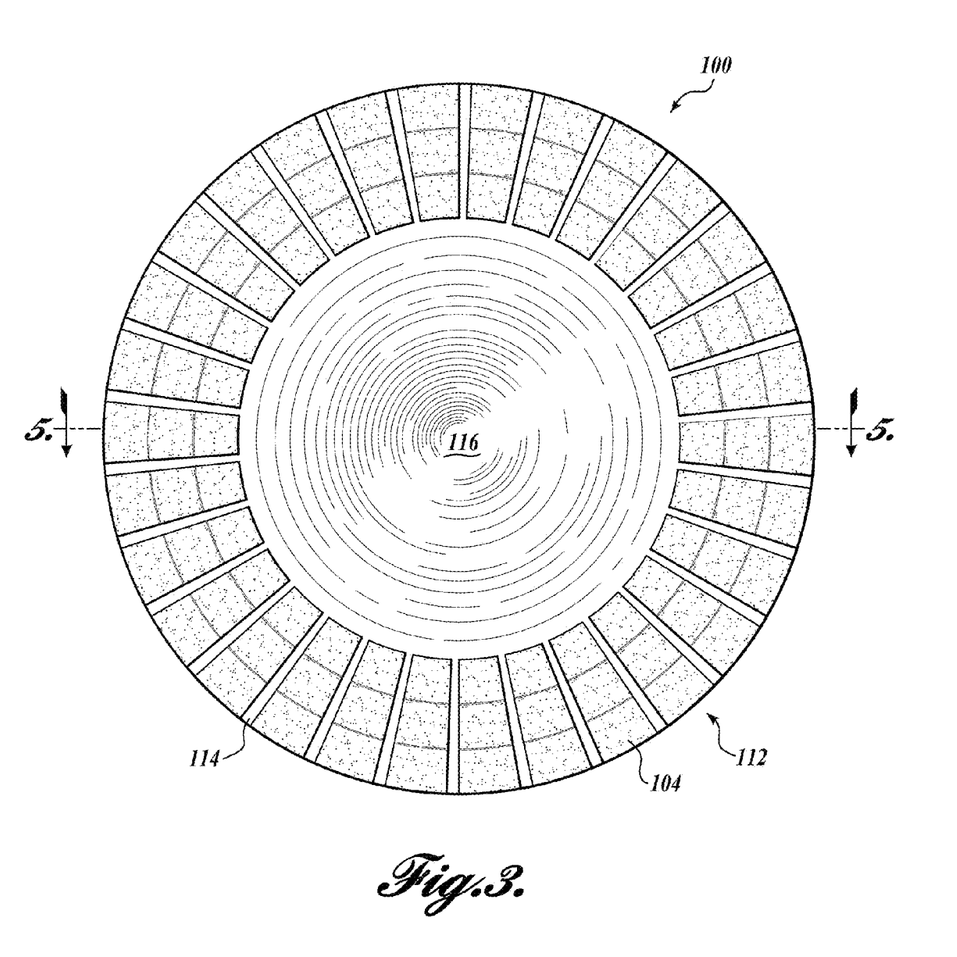
FIG. 3 is a bottom plan view of the suction device of FIG. 1.
Figure 4:
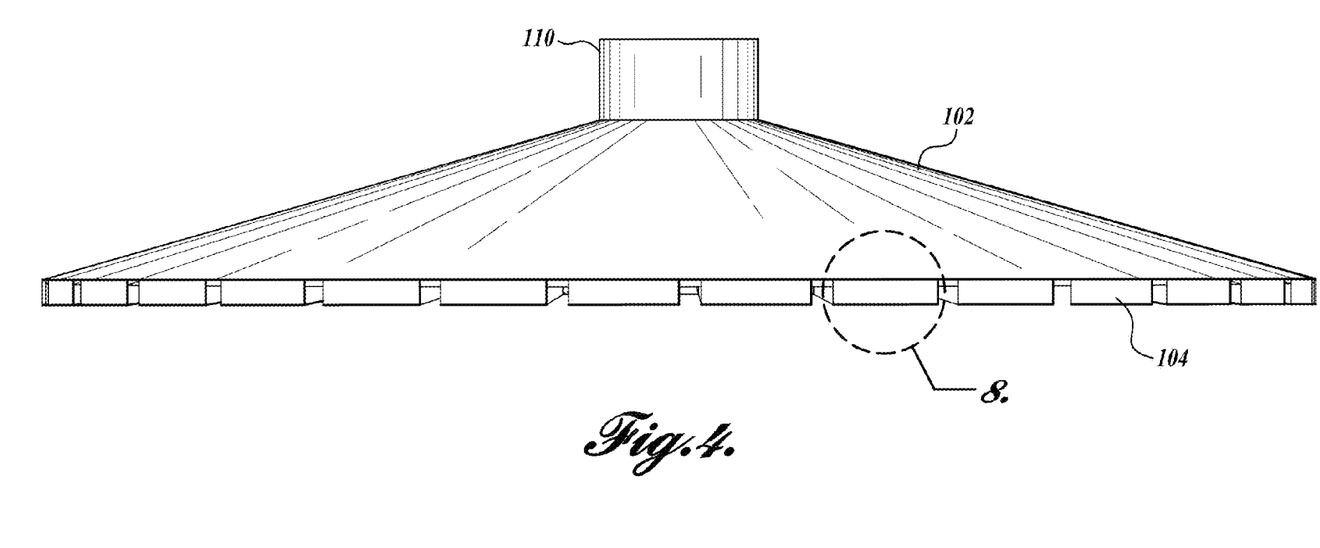
FIG. 4 is a side elevation view of the suction device of FIG. 1.
Figure 5:
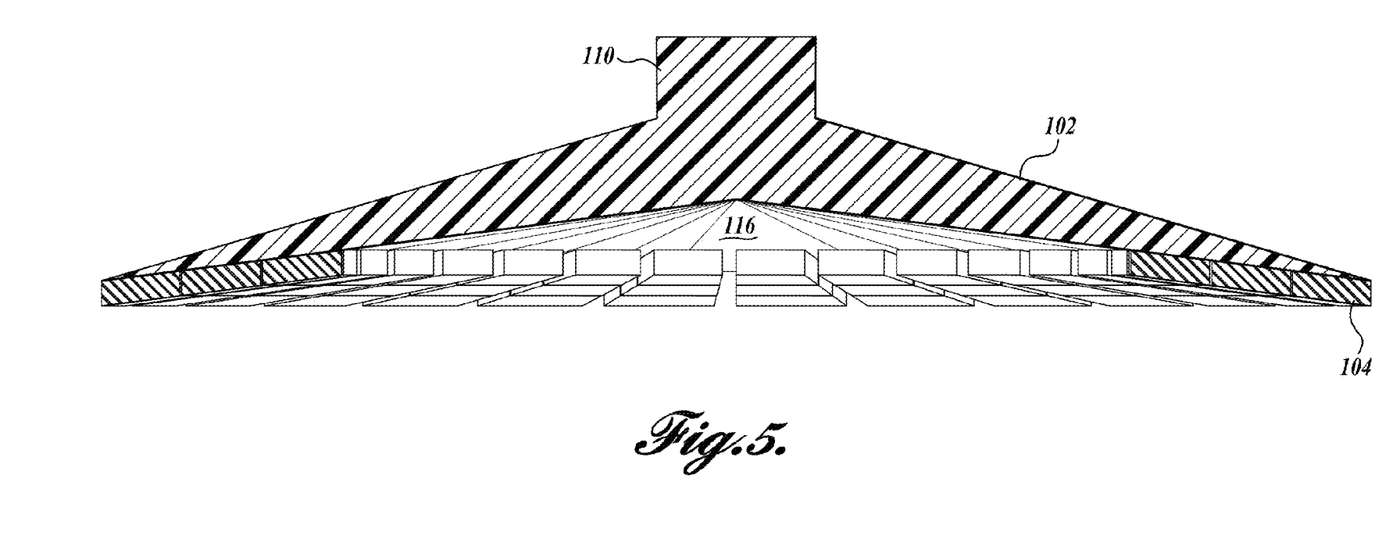
FIG. 5 is a cross-sectional view of the suction device of FIG. 3 across line 5-5.
Figure 8:
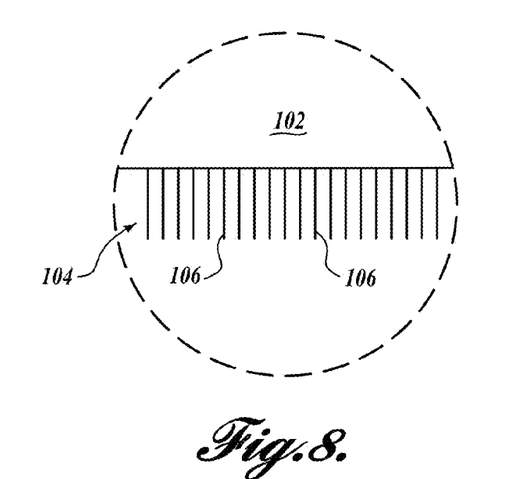
FIG. 8 is an enlarged side view of an edge of a suction device of FIG. 4.

As noted in FIG. 4, a detail of a friction pad 104 is provided in FIG. 8. Referring now to FIG. 8, the friction pad 104 depends from the body 102 of the suction device 100. While the friction pad 104 is illustrated in previous figures as being a solid surface, FIG. 8 illustrates that each friction pad 104 is in fact composed of a plurality of micro-rods 106 depending from the distal surface. The micro-rods are elongated and have a relatively large length-to-width aspect ratio. For example, in certain embodiments, the aspect ratio is 10:1. The diameter of the micro-rods is less than 1000 µm. In certain embodiments, the diameter of the micro-rods is less than 500 µm. In yet another embodiment, the diameter of the micro-rods is less than 200 µm.

The plurality of micro-rods have a packing density such that the one or more margins are predominantly bounded with micro-rods. As used herein, the term "predominantly bounded" is used to describe a configuration wherein the micro-rods cover at least 75% of the circumference of the one or more margins of the body 102 of the suction device 100. In a further embodiment, the micro-rods 106 cover at least 90% of the circumference of the suction device 100.

As illustrated in FIGS. 1-5, the micro-rods are arranged into friction pads 104 that include channels 114 arranged into columns 112. The channels are portions of the circumference of the device 100 that have no micro-rods. However, the size of these channels 114 must be relatively small, so as to prevent the transmission of gas and liquid between the suction area 116 and the outside of the device, as well as to allow sufficient friction between the friction pads 104 and the target surface so as to maintain a suction seal.

Figure 11:
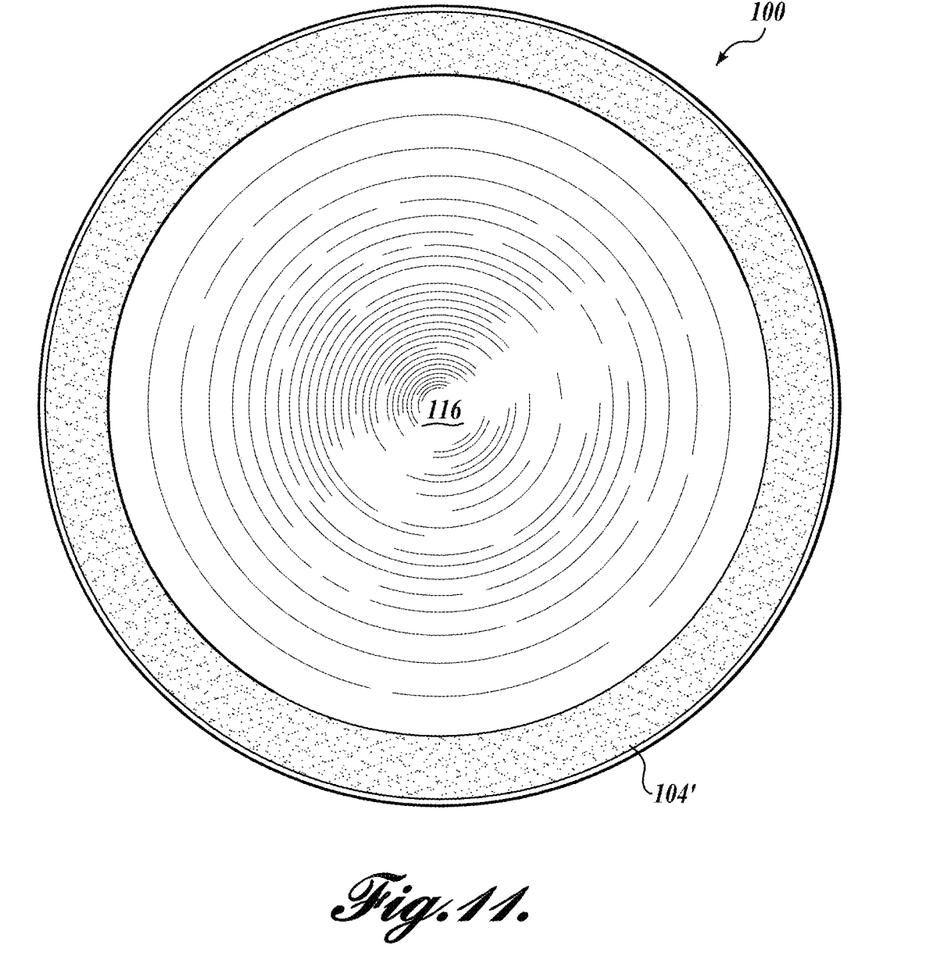
FIG. 11 is a bottom plan view of a suction device in accordance with the embodiments described herein.

In certain embodiments, the micro-rods form a continuous single friction pad 104', as illustrated in FIG. 11. Similarly, referring to FIGS. 12A-12C, the devices 100', 100", and 100''', respectively, each includes a single friction pad 104'. It will be appreciated by those of skill in the art that the friction pad 104 can be a single continuous pad or divided into multiple pads, as long as the suction mechanism described herein is able to operate sufficiently to generate a suction seal against the target surface.

In certain embodiments, the plurality of the elongated micro-rods have a diameter of less than 1 μm and an aspect ratio of 10 or more. In a further embodiment, the micro-rods have an aspect ratio of 100 or more. The aspect ratio of the micro-rods allows for both a high surface area of contact between the micro-rods and the target surface. Additionally, by having long and narrow micro-rods, the micro-rods can maintain a suction seal against even a rough target surface. In certain embodiments, the target surface has a roughness of 1 μm or less (root mean square).

In certain embodiments, each of the plurality of the elongated micro-rods has a lateral cross-section shape independently selected from the group consisting of a circle, an ellipse, and a polygon. While the plurality of micro-rods are typically uniform in shape and size, this is not required. Instead, the micro-rods can be of different sizes and shapes. Representative cross-sectional shapes include circles, ellipses, irregular patterns, and polygons. As used herein, polygons refer to any shape having three or more sides. The polygons can be regular or irregular. It will be appreciated by those of skill in the art that different manufacturing techniques can yield different micro-rod shapes. Additionally, the shape of the micro-rod can also define the properties of the micro-rods, particularly with regard to how well the micro-rods form the suction seal with the target surface.

In certain embodiments, the micro-rods are formed from the same material as the body. In such embodiments, the polymer material is chosen such that it provides both the flexibility and elastic restoration required for the body, as well as the friction characteristics required for the micro-rods. Silicones are typical polymer materials used in the embodiments provided. A representative material of such an embodiment is polydimethylsiloxane (PDMS).

In certain other embodiments, the body 102 and the micro-rods 106 are formed from different materials. In such embodiments, the body and micro-rods are formed separately and combined together. For example, the micro-rods can be formed on a separate surface that is then adhered to the suction area of the body so as to form a completed suction device. Such manufacturing techniques are well known to those of skill in the art and will not be discussed further herein.

Figure 6A:
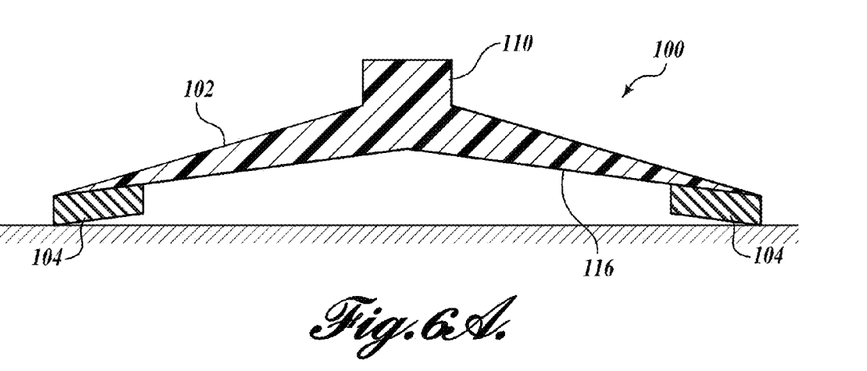
FIGS. 6A-6C are diagrammatic cross-sectional illustrations of the operation of a suction device in accordance with the embodiments described herein by elastic restoration.
Figure 6B:
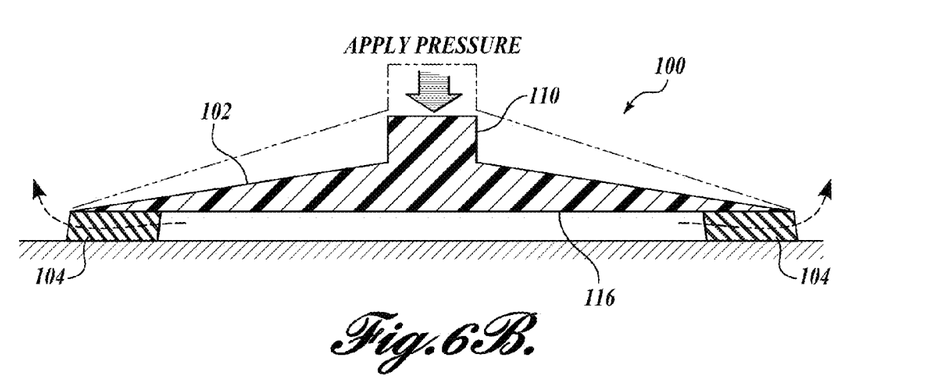

As mentioned previously, the suction device 100 operates to adhere to a target surface using a combination of the suction area 116 and the micro-rods 106 arranged into friction pads 104. One mechanism for generating suction will now be described further with reference to FIGS. 6A-6C. Referring to FIG. 6A, a device 100 (similar to that illustrated in FIGS. 1-5) is illustrated diagrammatically in cross section. The device 100 is in close apposition with a target surface, and the friction pads 104 rest on the target surface. Referring to FIG. 6B, pressure is applied to the body 102 so as to deform the body toward the target surface, thereby reducing the volume of space in between the suction surface 116 and the target surface. Arrows indicate the movement of gas or liquid from underneath the suction area 116, through the friction pads 104, and to the exterior of the device. In practice, if the device 100 is under water, the application of pressure, as illustrated in FIG. 6B, result in water underneath the device 100 being evacuated. Note that upon application of pressure in FIG. 6B, the friction pads 104 maintain their position along the target surface.

Figure 6C:
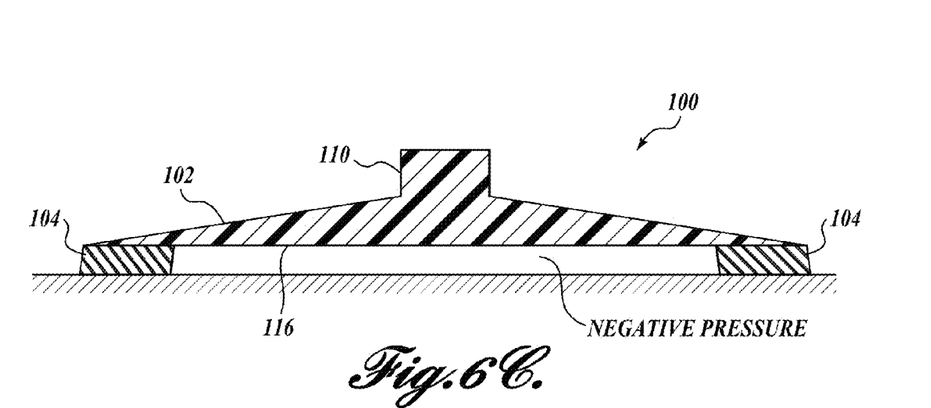

Due to the flexibility and composition of the body 102, an elastic restoration force exists moving away from the target surface. However, as illustrated in FIG. 6C, that elastic restoration force results in the generation of negative pressure in between the suction area 116 and the target surface. This negative pressure acts to create a suction force in conjunction with the friction provided between the micro-rods and the target surface. The friction provided by the micro-rods alone is insufficient to create adhesion between the device 100 and the target surface. Instead, the combination of the negative pressure generated and the friction of the micro-rods is required to generate sufficient adhesion.

Figure 7A:
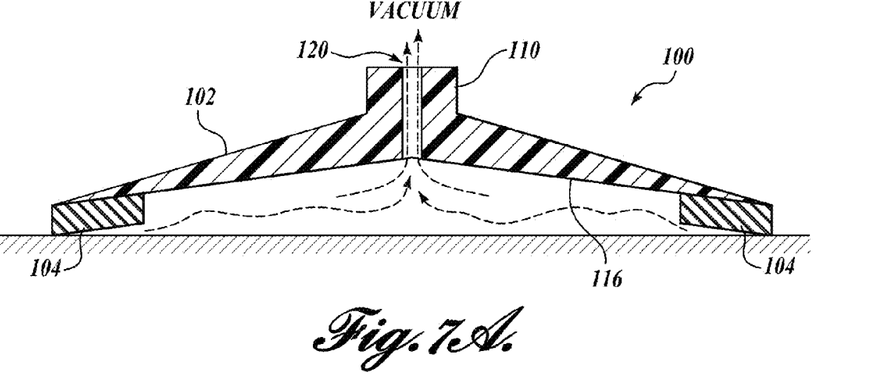
FIGS. 7A and 7B are diagrammatic cross-sectional illustrations of the operation of a suction device in accordance with the embodiments described herein by vacuum pressure.
Figure 7B:
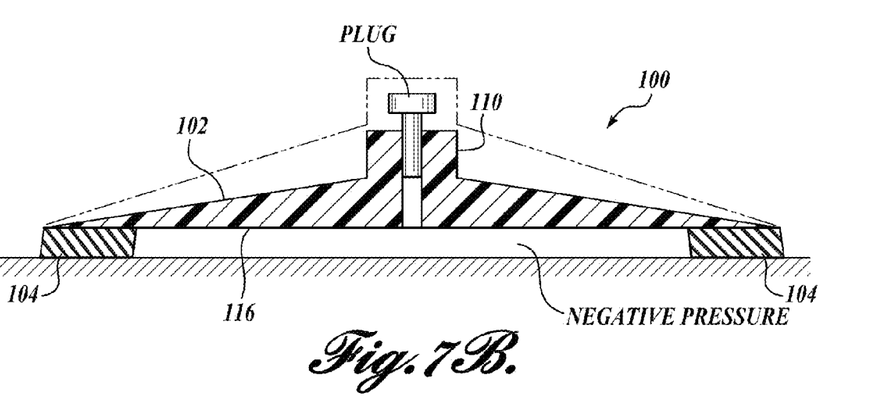

A second mechanism for generating the negative pressure required for suction is illustrated in FIGS. 7A and 7B. Referring to FIG. 7A, a modified version of the device 100 illustrated in FIGS. 1-5 is provided in diagrammatic cross section. A channel 120 is provided through the post 110 so as to allow for communication between the suction area 116 and the exterior of the device. As illustrated in FIG. 7A, vacuum is applied above the post and gas and/or liquid in between the suction area 116 and the target surface is removed from that area through the channel toward the source of vacuum. As illustrated in FIG. 7B, the flexible nature of the body 102 allows the body 102 to flex toward the target surface, thereby reducing the volume between the suction area 116 and the target surface. The channel 120 is plugged so as to block any transmission of gas and/or liquid between the exterior of the device 100 and the suction area 116. As described above with regard to FIGS. 6A-6C, the elastic restoration of the body 102 generates a negative pressure in the volume between the suction area 116 and the target surface. The combination of negative pressure and the friction generated by the friction pads results in a suction seal against the target surface.

Figure 9A:
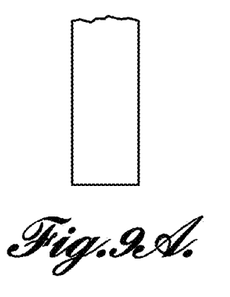
FIGS. 9A-9D are representative profile shapes of the distal ends of micro-rods in accordance with the embodiments described herein.
Figure 9B:
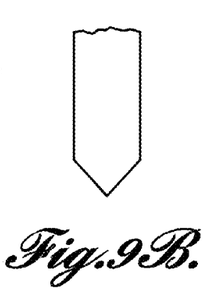
Figure 9C:
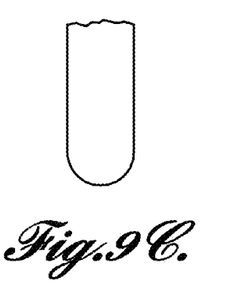
Figure 9D:
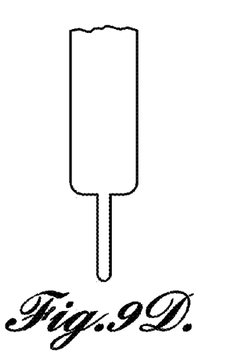
Figure 10A:
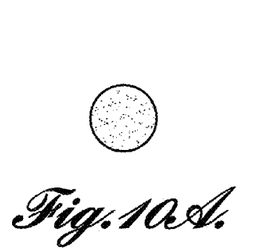
FIGS. 10A-10D are representative lateral cross-sectional shapes of the micro-rods in accordance with the embodiments described herein.
Figure 10B:
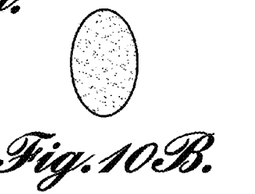
Figure 10C:
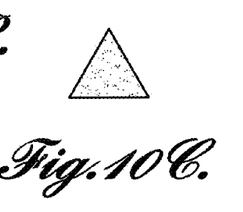
Figure 10D:
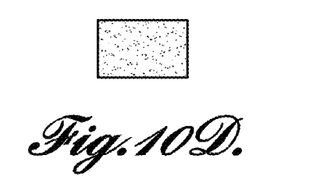

The plurality of micro-rods can be formed in any shape known to those of skill in the art. Representative profile shapes of the micro-rods are illustrated in FIGS. 9A-9D. As illustrated in FIG. 9A, the micro-rod may have a flat distal end (i.e., "tip"). Referring to FIG. 9B, the distal end may be pointed, either conical or pyramidal. Referring to FIG. 9C, the distal end may be rounded in a hemisphere or hemiellipsoid. Additionally, referring to FIG. 9D, the micro-rods may have a hierarchical structure such that the micro-rod terminates with a "nano-rod" depending from the apex of the distal end of the micro-rod. Such nano-rods can have a shape similar to the micro-rods, although their diameter is less than 1 μm.

The micro-rods do not terminate in paddles or spatulae, as do the textured structures found on gecko feet. In this regard, it is known that gecko feet include micro-structures sized and configured to adhere to a surface though friction and van der Waals forces. Conversely, the suction device disclosed herein does not operate through van der Waals forces, but instead relies on suction and friction. This is particularly relevant when used on a wet surface because introducing water in between the suction device and the target surface essentially eliminates van der Waals forces. Therefore, an alternative adhesion scheme must be used in a wet regime, as embodied by the disclosed suction device.

The micro-rods (and nano-rods) disclosed herein can have any latitudinal cross-sectional shape known to those of skill in the art. A number of representative cross-sectional shapes are illustrated in FIGS. 10A-10D, such as circular, ellipsoidal, triangular, and rectangular, respectively.

The suction device disclosed herein includes similarities to the clingfish adhesive disk, as described further in the below example. However, the suction device is not identical to the clingfish adhesive disk, as adaptations and improvements have been made to arrive at the suction device disclosed herein. However, it will be appreciated that the features of the clingfish can be replicated in the suction device. Therefore, for example, the shapes of the clingfish micro-rods and adhesive disk are replicated in certain embodiments of the provided suction device.

In certain embodiments, the suction device is configured to reversibly adhere to the target surface. In this regard, reversible adhesion refers to the ability to both adhere to the target surface and then release from the target surface. Any reversible adhesion technique known to those of skill in the art is applicable here, including applying sufficient pressure away from the target surface so as to overcome the adhesive forces, or to otherwise break the seal between the suction device and the target surface so as to release the negative pressure in between the suction area and the target surface (e.g., by releasing a valve in the device or disrupting the suction seal along the edge of the suction device adjacent the target surface).

In certain embodiments, the target surface is underwater, and the suction device is configured to adhere to the target surface underwater. As noted herein, the suction device is capable of adhering to wet or underwater (i.e., under-liquid) surfaces. The combination of negative pressure and friction from the micro-rods allows for adhesion between the suction device and the target surface despite rough surfaces and the presence of liquid. For the device to be configured to adhere to an underwater target surface, the micro-rods are patterned and have a density sufficient to provide the necessary frictional resistance to movement along the target surface despite the presence of liquid at the target surface and the roughness of the target surface. For example, the suction device is capable of adhering to rough, slippery underwater surfaces (e.g., rocks) covered, in surface coatings such as bryozoans and encrusting algae. Representative underwater target surfaces included boat hulls and structure, submerged man-made structures (such as oil rigs), living organisms including fish and invertebrates, and rocks.

In certain embodiments, the micro-rods can be apically attached to the distal end of a hierarchical structure that includes elongated intermediate rods in between the margins of the suction area and the micro-rods. Such a hierarchical structure is similar to that of the clingfish, wherein larger-diameter intermediate rods depend from the body and terminate in micro-rods. The intermediate rods have a diameter at least two orders of magnitude greater than the diameter of the micro-rods. The intermediate rods can be useful to provide greater space between the suction area of the body of the suction device and the target surface.

In certain embodiments, the intermediate rods and the micro-rods are formed from the same material. Typically, the intermediate rods and the micro-rods are formed during the same manufacturing process and from the same materials. However, in certain embodiments, the intermediate rods and the micro-rods are formed from different materials.

In certain embodiments, the suction device provides less adhesion to a nanoscale smooth surface (less than 1 nm RMS roughness) than a similar suction cup having no micro-rods.

In another aspect, a method is provided for attaching a suction device, as described herein, to a target surface. In one embodiment, the method includes the steps of:

placing the suction area in close apposition with the target surface; and generating negative pressure between the suction area and the target surface.

The method can be used to attach an object to a target surface via the suction device, as has been described in detail above. In certain embodiments, the target surface is wet or submerged in liquid (e.g., underwater).

As illustrated in FIGS. 6A-6C, in one embodiment, generating negative pressure between the suction area and the target surface comprises applying pressure to the suction device in the direction of the target surface that results in an elastic restoration of the suction area.

In another embodiment, as illustrated in FIGS. 7A and 7B, generating negative pressure between the suction area and the target surface comprises applying a vacuum to the suction area.

The following example is included for the purpose of illustrating, not limiting, the described embodiments.

Example

The rocky intertidal is an extreme environment with high, variable forces from crashing waves and strong water currents. Nevertheless, in near-shore environments worldwide, a family of fishes (Gobiesocidae) has evolved an adhesive disk that allows them to adhere to rocks with sufficient strength to resist dislodgement. The adhesive event is extremely fast and reversible despite the rugose intertidal surfaces being thoroughly fouled by algae, bryozoans, and other encrusting organisms. The fish is so well anchored it can launch predatory attacks on the archetypal attached mollusk, the limpet. We propose that this group of fish offers an unusual opportunity to understand the functional principles behind a high performance, reversibly adhesive disk capable of strong tenacity despite highly irregular, slippery, and wet surfaces.

Figure 13A:
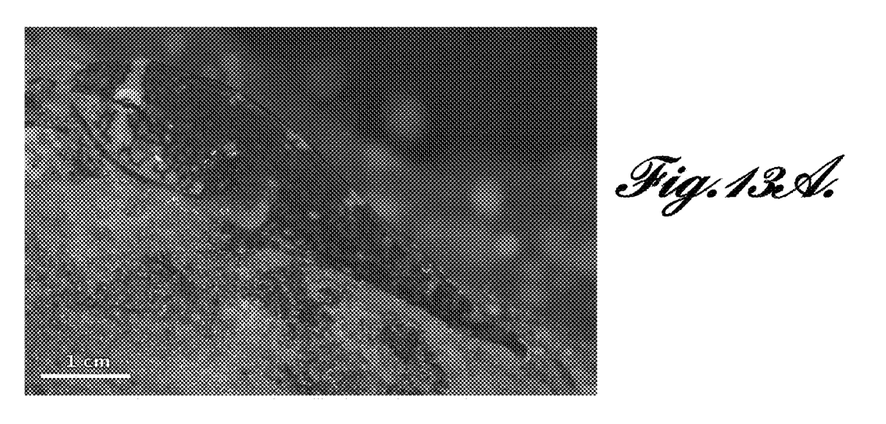
FIG. 13A is a photograph of the northern clingfish, *Gobiesox maeandricus* attached to a typical rock in the intertidal.
Figure 13B:
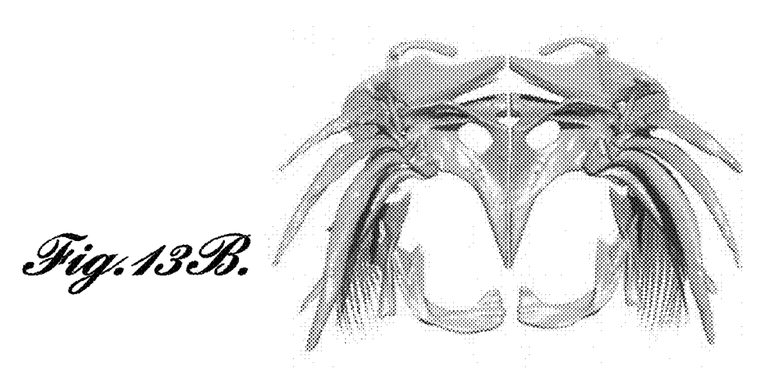
FIG. 13B is a ventral view of the adhesive disk of the clingfish. Unlike manufactured suction cups, the disk appears rough with many small papillae.
Figure 13C:
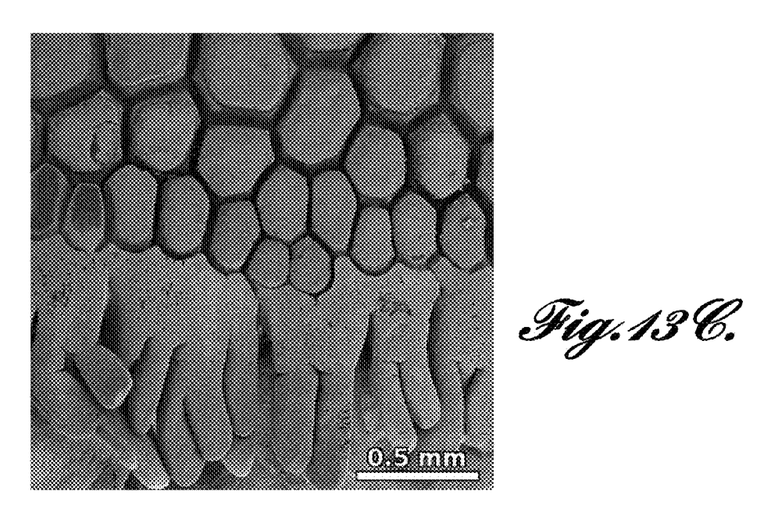
FIG. 13C is a scanning electron micrograph of the ventral surface of the adhesive disk at low magnification (×40). The papillae themselves are tiled, pad-like structures covered in mucus. The fimbriate edge of the disk is at the bottom of the image.

We examined the performance and morphology of the Northern Clingfish, *Gobiesox maeandricus*, a small (~16 cm) species found commonly in the Pacific northwest of the United States (a photograph is provided in FIG. 13A). The adhesive disk with which the fish attaches to the substrate is made up of elements of the pectoral and pelvic girdle. The attachment organ is roughly circular with two posterolateral vents and a fimbriate edge (FIGS. 13B and 13C). Unlike manufactured suction cups, this disk appears rough, with many small papillae evident to the naked eye. When attaching to a surface the fish rocks its pelvic girdle, forcing water out from under the disk and creating an area of negative pressure.

Adhesion, like friction, is highly dependent on characteristics of both surfaces being brought into contact. Roughness, material stiffness, wettability, surface chemistry and temperature can have substantial effects on adhesive strength. To control for these effects we tested the adhesion of clingfishes to surfaces with different roughness that were otherwise identical.

Results

Clingfishes Outperform Regular Suction Cups on Rough Surfaces.

Figure 14:
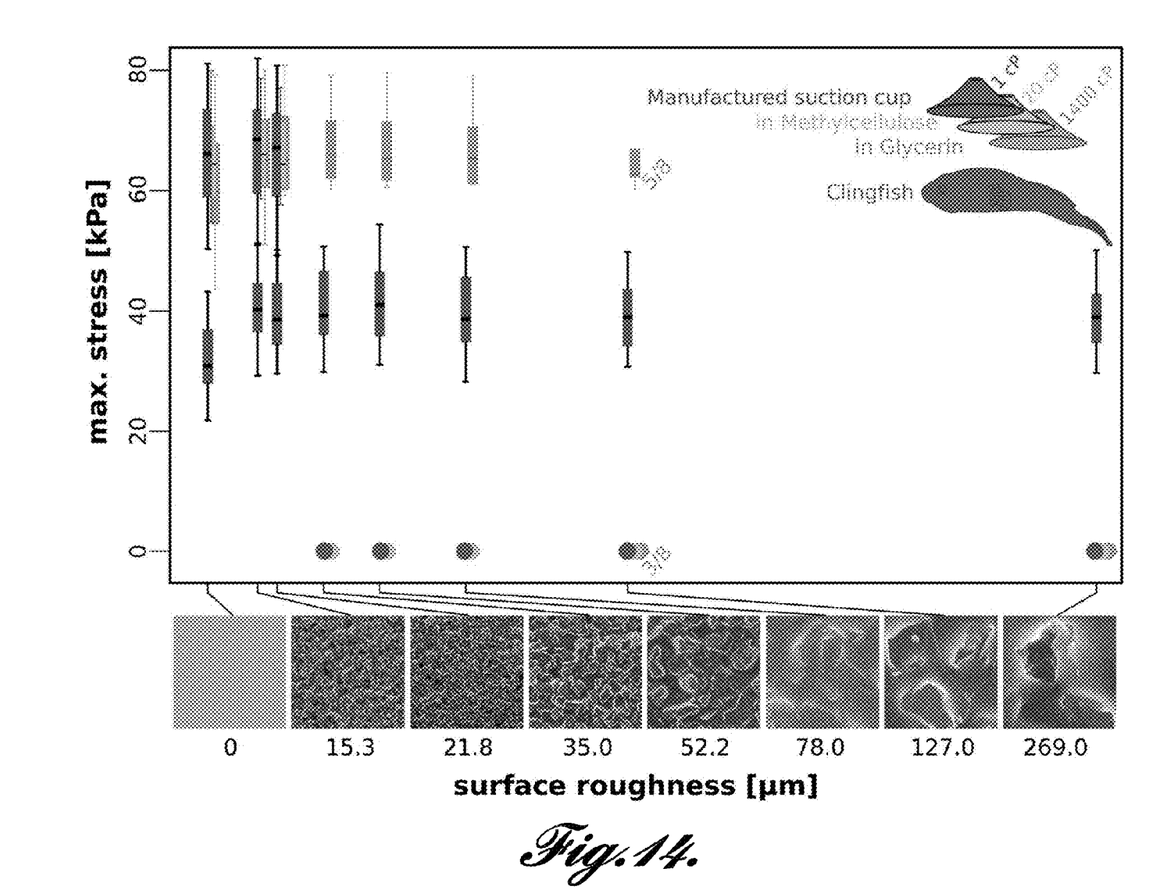
FIG. 14 plots of maximum adhesive stress (i.e. adhesive force per surface area) for clingfishes and manufactured suction cups at surfaces with different roughness submerged in seawater.

We measured peak stresses (i.e. force per surface area) that the adhesive disks of clingfishes and commercially available suction cups can withstand before they detach. Experiments were performed in seawater. We found that clingfishes can adhere equally well to all rugosities tested herein (roughness varied from 0 µm to 269 µm; Tukey HSD, p>0.98; FIG. 14), except for the nanoscale smooth surface where peak adhesive stresses were significantly lower (Tukey HSD, p<0.0023). The force of clingfish adhesion varied from 100-200 times body weight, while peak stress ranged from 15–50 kPa. On smooth surfaces, manufactured suction cups showed higher peak adhesive stresses than clingfishes (FIG. 14; two-way ANOVA, DF 1, F-value 304.1, p<0.001) but failed to adhere to surfaces with grit sizes of more than 21.8 µm.

To simulate the effect of fish mucous, we repeated the peak stress measurements for the manufactured suction cups in viscous liquids. We found that a 20 fold increase of the viscosity of the medium (comparable to fish mucous) did not help commercial suction cups to adhere to rougher surfaces; a 1400 fold increase in the viscosity of the medium allowed some commercial suction cups to adhere to rougher surfaces (up to 127 µm grit size) but they all still failed on the roughest surface tested herein (269 µm) (FIG. 14).

Clingfishes Use Hierarchically Structured Setae for Adhesion.

Figure 15A:
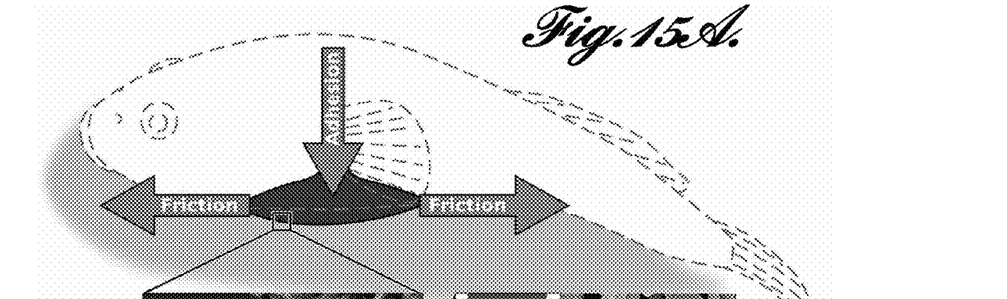
FIG. 15A is a schematic drawing of a clingfish adhering to a rock surface. Two types of forces act on the clingfish adhesive disk. (1) Adhesion acts normal to the surface and holds the fish to the rock; (2) friction acts parallel to the surface and prevents sliding of the adhesive disk along the substrate.
Figure 15B:
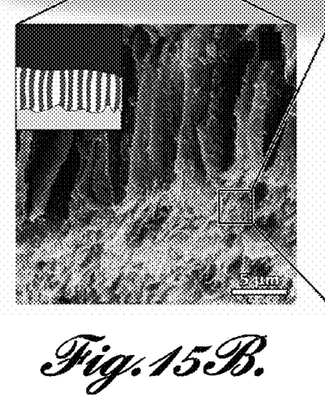
FIG. 15B is a SEM of one of the papillae on the ventral side of a clingfish adhesive disc at ×2,200 magnification. A papilla consists of multiple rods subdivided apically into numerous fine filaments.
Figure 15C:
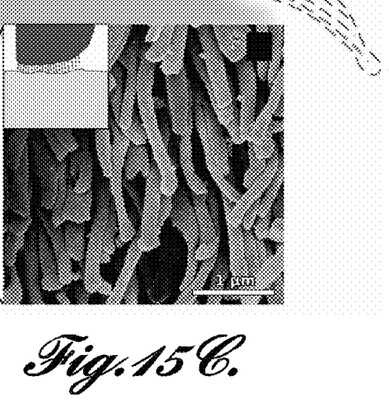
FIG. 15C is a SEM of the filaments on the tips of the rod-like structures on the ventral surface of the clingfish adhesive disk at ×22,000 magnification.

Scanning electron microscopy of the adhesive disk in clingfishes revealed that the papillae on the ventral face of the cling are arranged as a tiled surface with narrow channels between them. When the mucus was removed from these papillae, either though abrasion or sonication, they were identified as a hierarchically structured material. The papillae are subdivided into tightly packed rods with an aspect ratio of approximately 1:10 and a height of 15 µm. Each of these rods is apically subdivided into cylindrical filaments that are approximately 3 µm long and 0.2 µm in diameter (FIGS. 15A-15C).

Discussion

By using hierarchically structured setae on the ventral face of the adhesive disk, clingfishes can adhere equally well to a diversity of surfaces that differ extremely in roughness (from 15.3 µm to 269 µm tested herein). The setae of the clingfish are similar in size to the adhesive setae of arthropods and geckos and provide a striking case of convergent evolution. We suggest that the clingfish setae, in concert with the hierarchical structure, allow the edges of the suction cup to closely interdigitate with the asperities of the surface. This causes tight contact with the substrate and increased friction at the edge of the disk over a wide range of surface irregularities, and therefore allows exceptional suction performance in the face of challenging rough substrates.

The presence of a viscous fluid (e.g. mucous) generally allows suction devices to adhere to rougher surfaces. This can be explained by an increased Stefan adhesion in viscous fluids. The more viscous a fluid, the more slowly it flows through the gaps between the suction cup and the asperities of the substrate, allowing a poorer fit between suction cup and substrate to function with adequate tenacity. The viscosity of fish mucous is reported to be about twenty times that of water. Although we did demonstrate that a viscous medium allows manufactured suction cups to adhere to rougher surfaces, they still failed to adhere to the roughest surface we tested, even if tested in a liquid that had a viscosity of 70 times that of fish mucus (i.e. 1400 times the viscosity of water). We can conclude that the presence of mucus on the suction cup of the clingfish has a much smaller effect on adhesive performance than its structure. This is similar to the case of the attachment pad in mussel byssus threads, where the microstructure of the pad was found to be critical for adhesion.

Figure 15D:
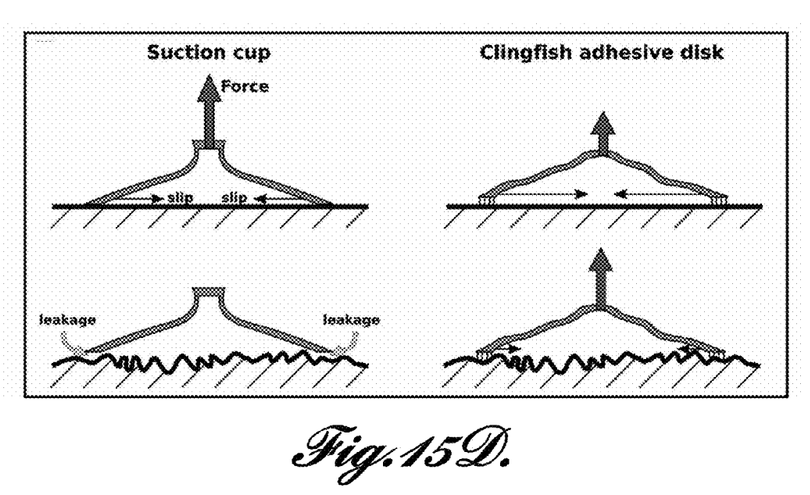
FIG. 15D is a schematic cross-sections through a manufactured suction cup and a clingfish adhesive disk. Pulling on a suction cup causes its sides to slip inward. The filaments on the ventral side of the adhesive disk in the clingfish cause higher friction and prevent slipping on rough surfaces. Furthermore, the flexible organic structure of the adhesive disk and its filaments allow for effective sealing of the adhesive disk to rough surfaces, while the stiff manufactured suction cups fail due to leakage.

Our surprising finding that clingfishes adhere with less tenacity to a nanoscale smooth surface than to rough surfaces seems to be at odds with our intuition based on daily experiences with suction cups. Friction plays an important role here, because when a suction cup fails, the edges slide towards the center of the cup (FIG. 15D). On the nanoscale smooth surface, friction is reduced, which we expect causes the adhesive disk of the clingfish to fail at lower tensile stress. Because manufactured suction cups are built from much stiffer materials compared to the adhesive disk in clingfishes, sliding of the edges towards the center does not appear to have an effect on suction performance.

The measured adhesive stresses are up to 50% of the maximum suction adhesion that is possible at atmospheric pressure (~101 kPa). The skeleton of the adhesive disk in clingfishes is connected to the pectoral girdle by extensive musculature. Attachment of the clingfish to the substrate is, at least in part, an active process, e.g. pulling the roof of the adhesive disk dorsally to increase the volume and to further lower the pressure in the chamber of the adhesive disk. Because our experiment was performed with dead animals we expect an even higher suction performance (about 20%) in live fishes.

Despite the similarities in structure of the setae, there are two notable differences between clingfishes and terrestrial organisms that have adhesive setae (geckos and arthropods): (1) clingfish adhesion happens completely under water and (2) the setae in clingfishes lack spatulate termini that increase apical flexibility and are important in van der Waals adhesion. Spatulate termini are often found in systems that support locomotion on smooth surfaces and their absence in clingfishes might be explained by the static nature of the clingfish system. The clingfish performance data and the morphology suggest a potential biomimetic avenue for improving suction performance on rough surfaces by mimicking a compliant, hierarchical surface at the edges of an attachment device.

Material and Methods

Specimens.

Twenty-two specimens of the Northern Clingfish, *Gobiesox meandricus*, were caught by hand in the rocky intertidal of San Juan Island, Wash., USA at low tide. Prior to the experiment, the fishes were euthanized and their mass, total length and surface area of the adhesive disk was determined. We performed length and surface area measurements based on digital photographs of the specimens that we loaded into ImageJ (http://rsbweb.nih.gov/ij/index.html). Animals in this study were approved for use in scientific research by the IACUC protocol held by APS at the University of Washington's Friday Harbor Laboratories (Friday Harbor, Wash., USA).

For comparison we further tested eight manufactured suction cups. Surface areas of the suction cups were measured based on digital images in ImageJ.

Surface Generation.

We created eight surfaces with different roughness to test the adhesive performance of clingfishes. To exclude the effects of different surface materials we made dental wax (Coltene President light body dental wax) molds of sandpapers with different grit sizes (Buehler® Carbimet 2 assorted grits). The assorted sandpaper package included the following grit sizes: 269 μm, 127 μm, 78 μm, 52.2 μm, 35 μm, 21.8 μm, and 15.3 μm. To create the surfaces, we made casts of the dental wax molds with an epoxy resin (SPI Supplies® SPI-Chem™ Low Viscosity Spurr Kit). The resin casts were baked at 70° C. for 24 h. The eighth surface was based on a dental wax mold that we made from glass and it was given a grit size of zero μm for analysis. The casted surfaces were glued into the bottom of small watertight aquaria (12.5 cm×9 cm×7 cm). We filled the aquaria 5 cm deep with seawater; new seawater was used for each fish.

Force Measurements.

We measured the maximum adhesive forces of the clingfishes with a MTS Synergie 100 materials testing machine that was equipped with a 500 N load cell. For the tensile test, we set the speed of the apparatus to 1 m/min to minimize leakage effects on the suction generated. We attached the fishes to the materials testing machine with a suturing thread that ran as a loop under the vertebral column near the rostral end of the suction disc and through the opercular gill openings. Manufactured suction cups were mounted by looping a suturing thread through their knobs (N=6) or by clamping them directly to the materials testing machine (N=2).

The first three trials for each specimen were not recorded (pre-sampling). After pre-sampling, we measured the adhesive forces of the specimens on each surface; the order of surfaces was chosen randomly by a random order generator that we programmed in the computing environment Octave (http://www.gnu.org/software/octave/). For each specimen we recorded four trials on each surface. In case a specimen could not adhere to a particular surface during a trial (i.e. it would become unattached after less than 30 s without experiencing a pulling force), the adhesion force for this surface was set to 0 N.

To mimic the presence of mucus we additionally tested the manufactured suction cups in liquids with two different viscosities: in a methylcellulose-seawater solution with a viscosity of 20 centipoise (CP) in 99% glycerin with a viscosity of 1400 CP.

Stress Calculations.

Maximum suction adhesion (F) depends on surface area of the suction cup (A) and the ambient pressure of the fluid outside the suction cup (p):

$$F = p*A \quad \text{Equation [1]:}$$

To consider the different sizes of the specimens, we compared the maximum tensile stresses before adhesion was released based on Equation 1:

$$p_{ad} = F_{ad}/A \quad \text{Equation [2]:}$$

$p_{ad}$ stands for the tensile stress, $F_{ad}$ is the measured adhesive force. The ratio of $p_{ad}$ to p can be used as measure of effectiveness of a suction cup.

Statistics.

Statistical analyses were calculated with the statistical computing environment R version 2.13.1 (http://www.r-project.org/). We applied a two-way ANOVA that treated surface roughness and specimen type (i.e. clingfish or suction cups) as independent and tensile stress as dependant variable. We further calculated one-way ANOVAs for the effect of surface roughness on adhesive stress in clingfish respectively suction cups and performed a Tukey Honestly Significant Difference test that is based on the results of the one-way ANOVAs.

Imaging.

We used scanning electron microscopy to study the epithelial microstructure of the adhesive disc. Specimens were either prepared by dehydration with ethanol and hexamethyldisilizane (HMDS) and examined with a NeoScope JCM 5000 tabletop SEM or were studied with a Hitachi S-4800 SEM that was equipped with a Gatan ALTO 2500 cryo-preparation device.

While illustrative embodiments have been illustrated and described, it will be appreciated that various changes can be made therein without departing from the spirit and scope of the invention.

The invention claimed is:

1. A suction device having the ability to adhere to a rough surface, comprising:
a body formed from a polymer and having a suction area defined by one or more margins configured to rest in close apposition with a target surface, wherein the suction area is flexible and configured to create a suction seal against the target surface with negative pressure between the suction area and the target surface; and
a plurality of elongated micro-rods depending from the one or more margins, wherein each of the plurality of elongated micro-rods is less than 1000 microns in diameter, the plurality of micro-rods have a packing density such that the one or more margins are predominantly bounded with micro-rods, wherein the size, composition, and packing density of the micro-rods provide sufficient friction between the micro-rods and the target surface to maintain the suction seal between the suction area and the target surface;
wherein the body of the suction device and the plurality of micro-rods are configured to adhere to the target surface through a combination of suction generated by the negative pressure between the suction area and the target surface and friction generated between the plurality of micro-rods and the target surface.

2. The suction device of claim 1, wherein the suction device is configured to reversibly adhere to the target surface.

3. The suction device of claim 1, wherein the target surface is underwater and wherein the suction device is configured to adhere to the target surface underwater.

4. The suction device of claim 1, wherein each of the plurality of elongated micro-rods has a diameter of less than one micron and an aspect ratio of 10 or more.

5. The suction device of claim 1, wherein each of the plurality of elongated micro-rods has a lateral cross-section shape independently selected from the group consisting of a circle, an ellipse, and a polygon.

6. The suction device of claim 1, wherein at least a portion of the plurality of elongated micro-rods are apically attached to the distal end of a hierarchical structure that includes elongated intermediate rods in between the margins of the suction area and the micro-rods, wherein the intermediate rods have a diameter at least two orders of magnitude greater than the diameter of the micro-rods.

7. The suction device of claim 6, wherein the intermediate rods and the micro-rods are formed from the same material.

8. The suction device of claim 1, wherein the suction area and the micro-rods are formed from the same material.

9. The suction device of claim 1, wherein the negative pressure is generated by elastic restoration of the suction area after the suction area is compressed towards the target surface.

10. The suction device of claim 1, wherein the negative pressure is generated by applying a vacuum to the suction area.

11. The suction device of claim 1, wherein the rods terminate in a shape selected from the group consisting of a flat surface, a point, a hemisphere, and a hemiellipsoid.

12. The suction device of claim 1, wherein the plurality of micro-rods have a packing density such that the one or more margins are continuously bounded with micro-rods.

13. A method for attaching the suction device according to claim 1 to a target surface, the method comprising:
   placing the suction area in close apposition with the target surface; and
   generating negative pressure between the suction area and the target surface.

14. The method of claim 13, wherein the target surface is in water and has a surface roughness of up to 1000 microns.

15. The method of claim 13, wherein generating negative pressure between the suction area and the target surface comprises applying pressure to the suction device in the direction of the target surface that results in an elastic restoration of the suction area.

16. The method of claim 13, wherein generating negative pressure between the suction area and the target surface comprises applying a vacuum to the suction area.

17. The suction device of claim 1, wherein the micro-rods are grouped together in one or more friction pads.

18. The suction device of claim 17, wherein the one or more friction pads are configured to provide channels between the one or more friction pads.

* * * * *